United States Patent
Maeda

(10) Patent No.: US 12,287,976 B2
(45) Date of Patent: Apr. 29, 2025

(54) STORAGE SYSTEM, MANAGEMENT METHOD OF STORAGE SYSTEM, AND MANAGEMENT DEVICE OF STORAGE SYSTEM

(71) Applicant: Hitachi, Ltd., Tokyo (JP)

(72) Inventor: Yukiya Maeda, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/242,457

(22) Filed: Sep. 5, 2023

(65) Prior Publication Data

US 2024/0393963 A1 Nov. 28, 2024

(30) Foreign Application Priority Data

May 25, 2023 (JP) ................................ 2023-086228

(51) Int. Cl.
*G06F 3/06* (2006.01)

(52) U.S. Cl.
CPC .......... *G06F 3/0625* (2013.01); *G06F 3/0653* (2013.01); *G06F 3/067* (2013.01)

(58) Field of Classification Search
CPC ...... G06F 3/0625; G06F 3/0653; G06F 3/067; G06F 3/0647; G06F 2009/4557; G06F 9/5088; G06F 9/4856; G06F 16/21427; G06F 16/119; G06F 16/214; G06F 16/27; G06F 3/0649; G06F 3/0685; G06F 3/0689; H04L 67/148; H04L 67/1097
See application file for complete search history.

(56) References Cited

U.S. PATENT DOCUMENTS

| | | | |
|---|---|---|---|
| 2010/0030791 A1* | 2/2010 | Iverson | G06F 16/1737 713/320 |
| 2010/0070784 A1* | 3/2010 | Gupta | H04L 43/04 713/320 |
| 2010/0274766 A1* | 10/2010 | Nagashima | G06F 3/0625 711/E12.001 |

(Continued)

FOREIGN PATENT DOCUMENTS

| | | |
|---|---|---|
| JP | 2018-151815 A | 9/2018 |
| JP | 6751281 B2 * | 9/2020 ........... G06F 3/0605 |

OTHER PUBLICATIONS

English Translation of JP-6751281-B2 (Year: 2020).*

*Primary Examiner* — Rocio Del Mar Perez-Velez
*Assistant Examiner* — Julian S Mendel
(74) *Attorney, Agent, or Firm* — PROCOPIO, CORY, HARGREAVES & SAVITCH LLP

(57) ABSTRACT

Data movement for reducing an environmental load in a hierarchical storage is appropriately determined. A storage system includes an upper-level storage device and a management device. The management device is configured to determine, for each file stored in the upper-level storage device, based on a size of a target file and an access frequency of the target file, and the power consumption information, whether power consumption for holding the target file is to be reduced by moving the target file to the lower-level storage device, and output, when it is determined that the power consumption for holding the target file is to be reduced by moving the target file to the lower-level storage device, an instruction to move the target file from the upper-level storage device to the lower-level storage device.

9 Claims, 13 Drawing Sheets

(56) References Cited

U.S. PATENT DOCUMENTS

| | | | |
|---|---|---|---|
| 2012/0102350 A1* | 4/2012 | Belluomini | G06F 1/3221 |
| | | | 711/E12.001 |
| 2014/0208322 A1* | 7/2014 | Sasaki | G06F 9/45558 |
| | | | 718/1 |
| 2018/0260413 A1 | 9/2018 | Matsui et al. | |
| 2023/0273807 A1* | 8/2023 | Uppalapati | G06F 1/3206 |
| | | | 718/1 |

* cited by examiner

FIG. 6

LOWER-LEVEL DEVICE MANAGEMENT TABLE

| LOWER-LEVEL DEVICE NAME (601) | PRODUCT NUMBER (602) | POWER CONSUMPTION DURING IDLING [w] (603) | POWER CONSUMPTION DURING READING [w] (604) | POWER CONSUMPTION DURING WRITING [w] (605) |
|---|---|---|---|---|
| A | aaaa | xx | xx | xx |
| B | bbbb | - | ○○ | ○○ |
| ... | ... | ... | ... | ... |

POWER CONSUMPTION HISTORY TABLE DURING IDLING

| DATE AND TIME (701) | POWER CONSUMPTION AMOUNT (702) |
|---|---|
| x/xx xx:xx | xxxx |
| ... | ... |

MOVEMENT FILE PATH MANAGEMENT TABLE

| MOVEMENT TARGET FILE NAME | MOVEMENT SOURCE FILE PATH | MOVEMENT DESTINATION DEVICE AND PATH |
|---|---|---|
| A | E:¥○○¥○○ | ○○ |
| B | E:¥○○¥xx | xx |
| ... | ... | ... |

FIG. 9

FILE LIST (WHOLE)      404

| FILE NAME (901) | FILE SIZE (GB) (902) | LAST UPDATE DATE AND TIME (903) |
|---|---|---|
| A | 1.0 | ○○/○○ ○○:○○ |
| B | 0.5 | xx/xx xx:xx |
| ... | ... | ... |

FIG. 10

FILE LIST (MOVEMENT TARGET)      405

| FILE NAME (1001) | FILE SIZE (GB) (1002) | LAST UPDATE DATE AND TIME (1003) |
|---|---|---|
| C | 2.0 | ○○/○○ ○○:○○ |
| D | 4.0 | xx/xx xx:xx |
| ... | ... | ... |

FIG. 11

THRESHOLD TABLE

| TARGET FILE SIZE | ELAPSED TIME FROM LAST UPDATE DATE AND TIME [h] |
|---|---|
| ~xGB | a |
| xGB~○GB | b |
| ○GB~ | c |

FIG. 12

CYCLE TABLE

| PROCESSING NAME | EXECUTION CYCLE |
|---|---|
| FILE UPDATE INFORMATION ACQUISITION | ○DAYS |
| THRESHOLD DETERMINATION AND MOVEMENT TARGET LIST UPDATE | ○DAYS |
| FILE HIERARCHY MOVEMENT (INCLUDING INSTRUCTION) | ○DAYS |

FIG. 13

STORAGE USAGE AMOUNT TRANSITION MANAGEMENT TABLE

| DATE AND TIME | STORAGE USAGE AMOUNT [GB] |
|---|---|
| x/xx xx:xx | xxxx |
| ... | ... |

FIG. 14

POWER REDUCTION AMOUNT TRANSITION TABLE

| DATE AND TIME | POWER REDUCTION AMOUNT [kWh] |
|---|---|
| x/xx xx:xx | xxxx |
| ... | ... |

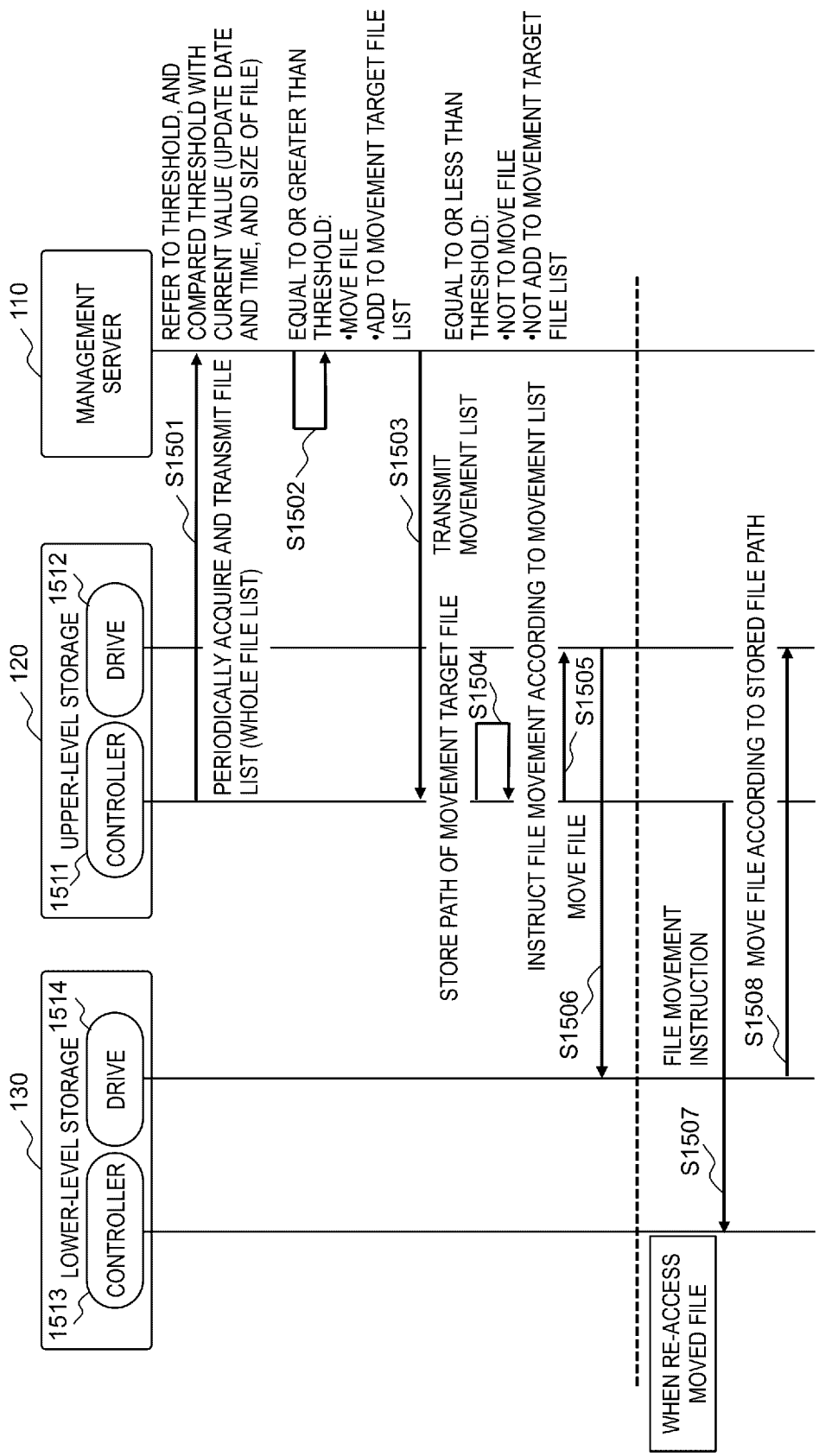

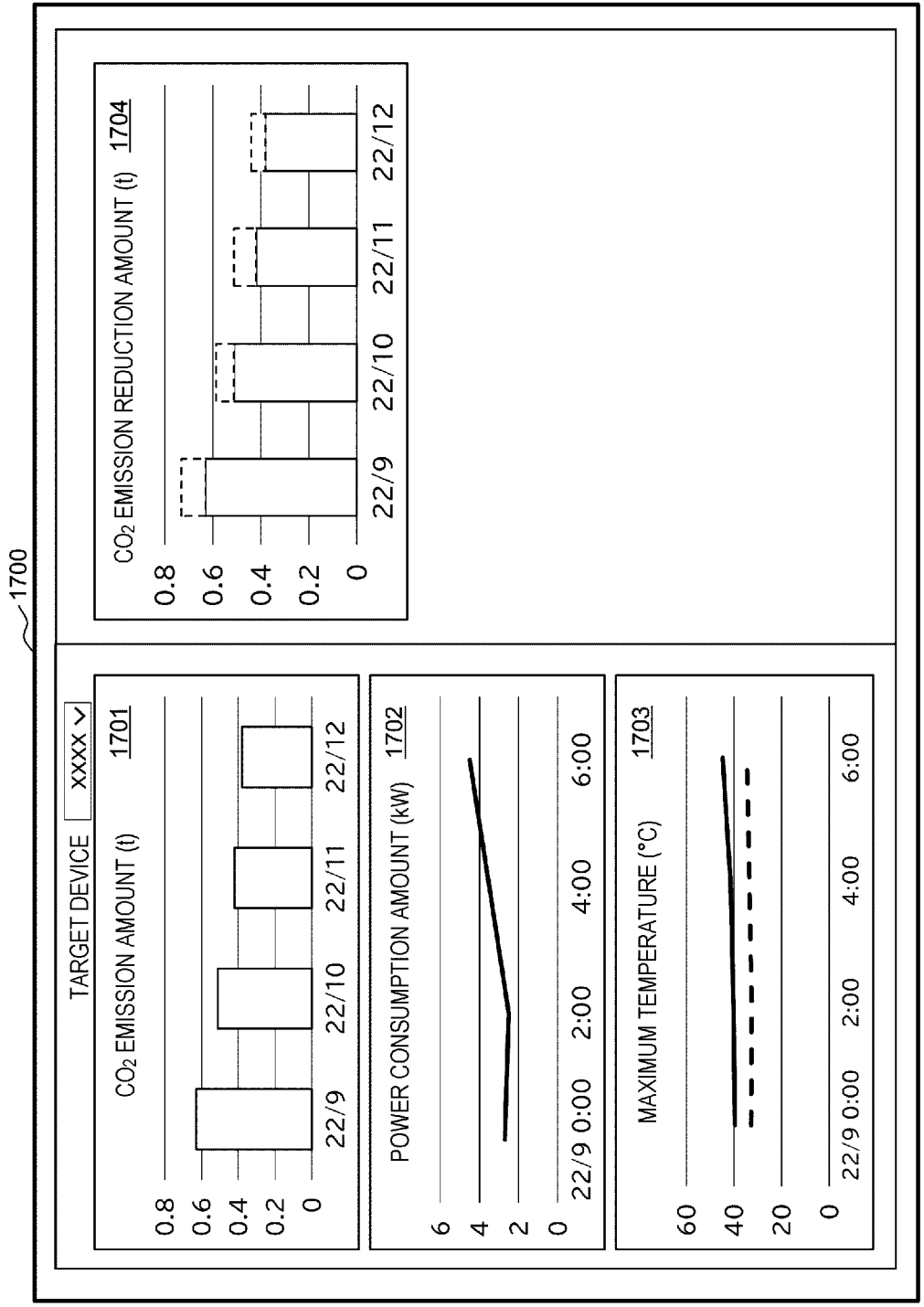

STORAGE SYSTEM, MANAGEMENT METHOD OF STORAGE SYSTEM, AND MANAGEMENT DEVICE OF STORAGE SYSTEM

CLAIM OF PRIORITY

The present application claims priority from Japanese patent application JP 2023-086228 filed on May 25, 2023, the content of which is hereby incorporated by reference into this application.

BACKGROUND OF THE INVENTION

1. Field of the Invention

The present invention relates to a control technique of a storage system focusing on an environmental load.

2. Description of Related Art

As a technique related to reduction of a power consumption amount of a hierarchical storage, for example, there is a technique described in JP2018-151815A (PTL 1). PTL 1 discloses "a storage management system including a computer that manages a hierarchical storage including a primary storage and a secondary storage. The storage management system includes a determination unit and a rearrangement unit. The determination unit determines whether to move a file stored in the primary storage to the secondary storage based on a condition for determining, based on a size of the file and an access interval time of the file, a storage destination of the file that is superior in terms of a power consumption amount in the primary storage and the secondary storage. The rearrangement unit moves the file stored in the primary storage to the secondary storage according to the determination."

CITATION LIST

Patent Literature

PTL 1: JP2018-151815A

SUMMARY OF THE INVENTION

PTL 1 discloses a magnetic tape device as the secondary storage. However, in practice, a device other than the magnetic tape device may be used as long as the secondary storage requires a power consumption amount for holding data less than the primary storage. In order to determine whether to move data so as to reduce the power consumption amount as a whole (that is, reduce the $CO_2$ emission amount), it is necessary to consider, in addition to the power consumption amount required for holding data, the power consumption amount required for data movement between the primary storage and the secondary storage.

In order to solve at least one of the above problems, a typical example of the invention disclosed in the present application is a storage system. The storage system includes: an upper-level storage device configured to hold data; a lower-level storage device whose power consumption for holding data is smaller than that of the upper-level storage device; and a management device connected to the upper-level storage device and the lower-level storage device. The management device includes a processor and a memory. The memory is configured to hold file information including information indicating a size of each file held in the upper-level storage device and information related to an access frequency of the file, and power consumption information including information related to power consumption of the upper-level storage device and the lower-level storage device. The processor is configured to determine, for each file stored in the upper-level storage device, based on a size of a target file and an access frequency of the target file acquired from the file information, and the power consumption information, whether power consumption for holding the target file is to be reduced by moving the target file to the lower-level storage device, and output, when it is determined that the power consumption for holding the target file is to be reduced by moving the target file to the lower-level storage device, an instruction to move the target file from the upper-level storage device to the lower-level storage device.

According to an aspect of the invention, when various devices are used as a lower-level storage in a hierarchical storage, it is possible to appropriately determine whether to move data to reduce an environmental load in consideration of a power consumption amount required for data movement. Problems, configurations, and effects other than those described above will be clarified with the following description of embodiments.

BRIEF DESCRIPTION OF THE DRAWINGS

FIG. 6 is a diagram showing a lower-level device management table held by the management server according to the embodiment of the invention;

FIG. 7 is a diagram showing a power consumption history table during idling held by the management server according to the embodiment of the invention;

FIG. 8 is a diagram showing a movement file path management table held by the management server according to the embodiment of the invention;

FIG. 9 is a diagram showing a file list (whole) held by the management server according to the embodiment of the invention;

FIG. 10 is a diagram showing a file list (movement target) held by the management server according to the embodiment of the invention;

FIG. 11 is a diagram showing a threshold table held by the management server according to the embodiment of the invention;

FIG. 12 is a diagram showing a cycle table held by the management server according to the embodiment of the invention;

FIG. 13 is a diagram showing a storage usage amount transition management table held by the management server according to the embodiment of the invention;

FIG. 14 is a diagram showing a power reduction amount transition table held by the management server according to the embodiment of the invention;

FIG. 15 is a sequence diagram showing processing executed in the storage system according to the embodiment of the invention;

FIG. 17 is a diagram showing a screen displayed by the storage system according to the embodiment of the invention.

DESCRIPTION OF EMBODIMENTS

Hereinafter, embodiments of the invention will be described with reference to the drawings.

Figure 1:
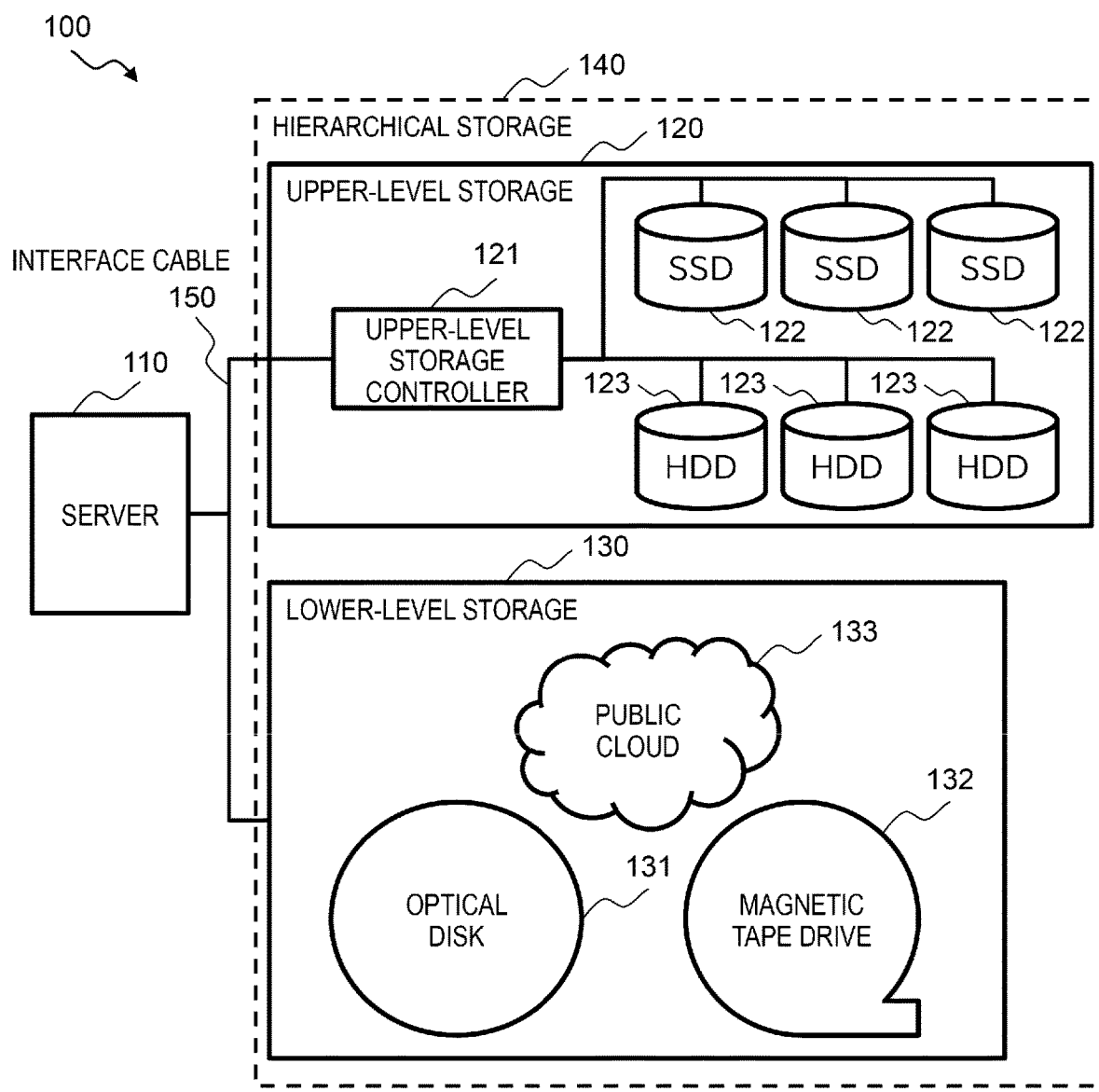
FIG. 1 is a block diagram showing an overall configuration of a storage system according to an embodiment of the invention.

FIG. 1 is a block diagram showing an overall configuration of a storage system according to an embodiment of the invention.

A storage system 100 according to the embodiment includes a management server 110, an upper-level storage 120, and a lower-level storage 130. The management server 110 is connected to the upper-level storage 120 and the lower-level storage 130 by an interface cable 150.

The upper-level storage 120 and the lower-level storage 130 constitute a hierarchical storage 140. For example, the upper-level storage 120 stores data written by a host computer (not shown), and data satisfying a predetermined condition such as a low access frequency among the data is moved to the lower-level storage 130. The management server 110 manages data movement between the upper-level storage 120 and the lower-level storage 130.

The upper-level storage 120 is a storage device in which in return for a relatively high access speed and the like, power consumption required to hold data is relatively large. A typical example of the upper-level storage 120 is a redundant arrays of inexpensive disks (RAID) device implemented with a plurality of hard disk drives (HDD) 123 or a plurality of solid state drives (SSD) 122. Writing and reading of data to and from the plurality of HDDs or SSDs are controlled by an upper-level storage controller 121. When the plurality of HDDs or SSDs constitute the RAID, the upper-level storage controller 121 is a RAID controller.

The lower-level storage 130 is a storage device having a relatively low performance in return for relatively low power consumption required to hold data. Typical examples of the lower-level storage 130 include an optical disk drive 131, a magnetic tape drive 132, and a public cloud 133. The lower-level storage 130 may include two or more of these.

Figure 2:
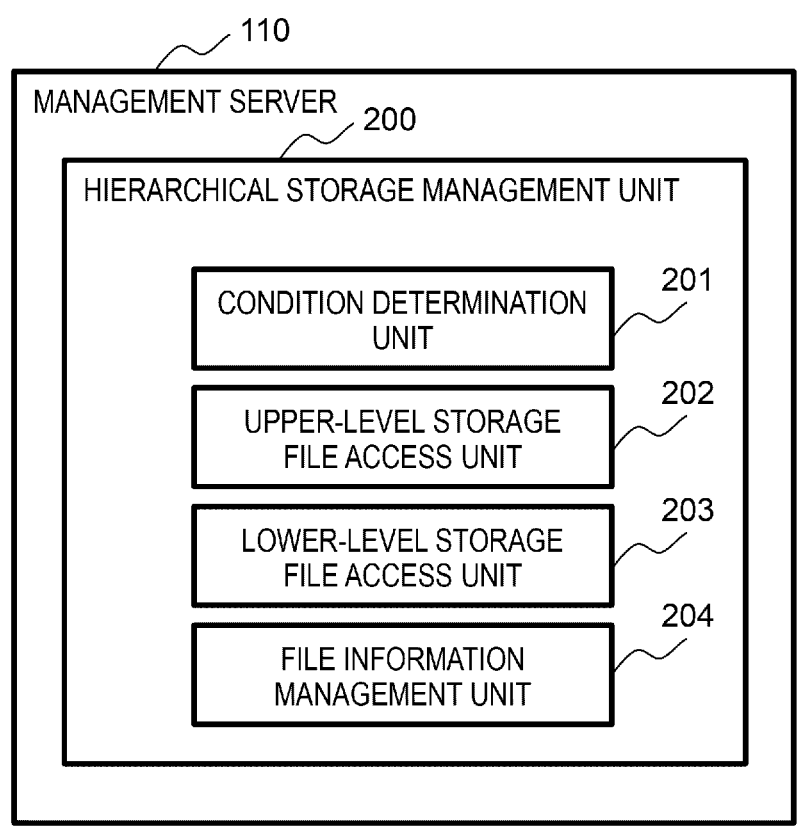
FIG. 2 is a block diagram showing a configuration of a management server provided in the storage system according to the embodiment of the invention.

FIG. 2 is a block diagram showing a configuration of the management server 110 provided in the storage system according to the embodiment of the invention.

The management server 110 includes a hierarchical storage management unit 200. The hierarchical storage management unit 200 includes a condition determination unit 201, an upper-level storage file access unit 202, a lower-level storage file access unit 203, and a file information management unit 204.

The condition determination unit 201 determines whether to move the data stored in the upper-level storage 120 to the lower-level storage e 130 for each file according to a predetermined condition. Details of the determination will be described later. The upper-level storage file access unit 202 and the lower-level storage file access unit 203 control access to files stored in the upper-level storage 120 and the lower-level storage 130. The file information management unit 204 manages information related to the files stored in the upper-level storage 120.

Figure 3:
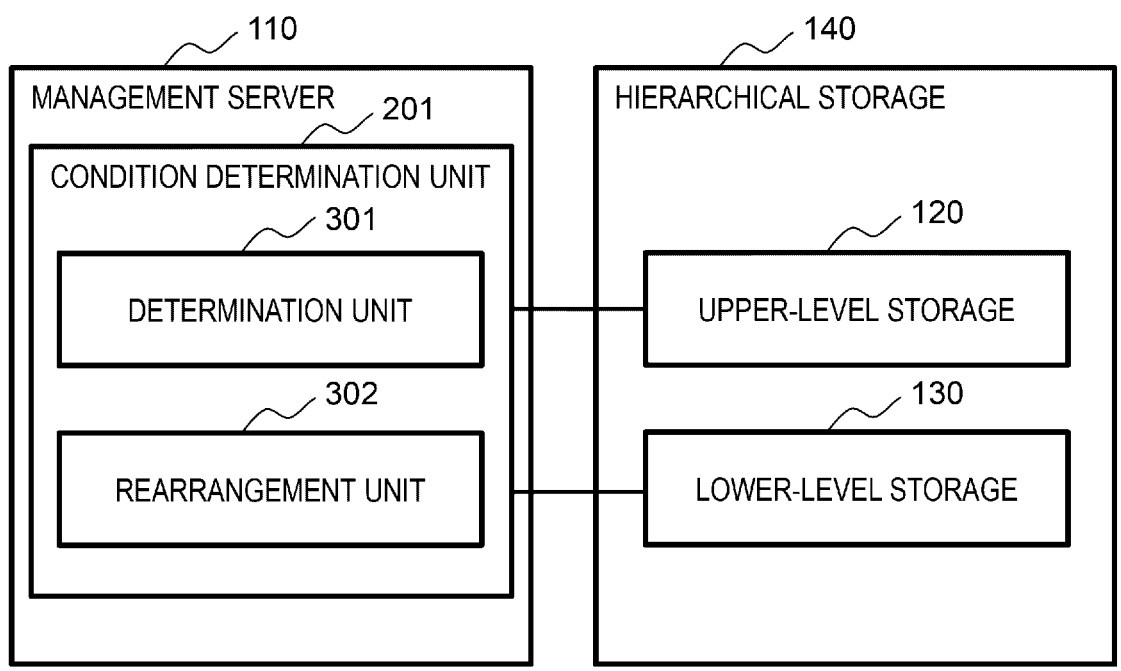
FIG. 3 is a block diagram showing a configuration of a condition determination unit provided in the management server according to the embodiment of the invention.

FIG. 3 is a block diagram showing a configuration of the condition determination unit 201 provided in the management server 110 according to the embodiment of the invention.

The condition determination unit 201 includes a determination unit 301 and a rearrangement unit 302. The determination unit 301 determines whether to move the files stored in the upper-level storage 120 to the lower-level storage 130 based on the predetermined condition. The rearrangement unit 302 moves the files according to a determination result of the determination unit 301.

Figure 4:
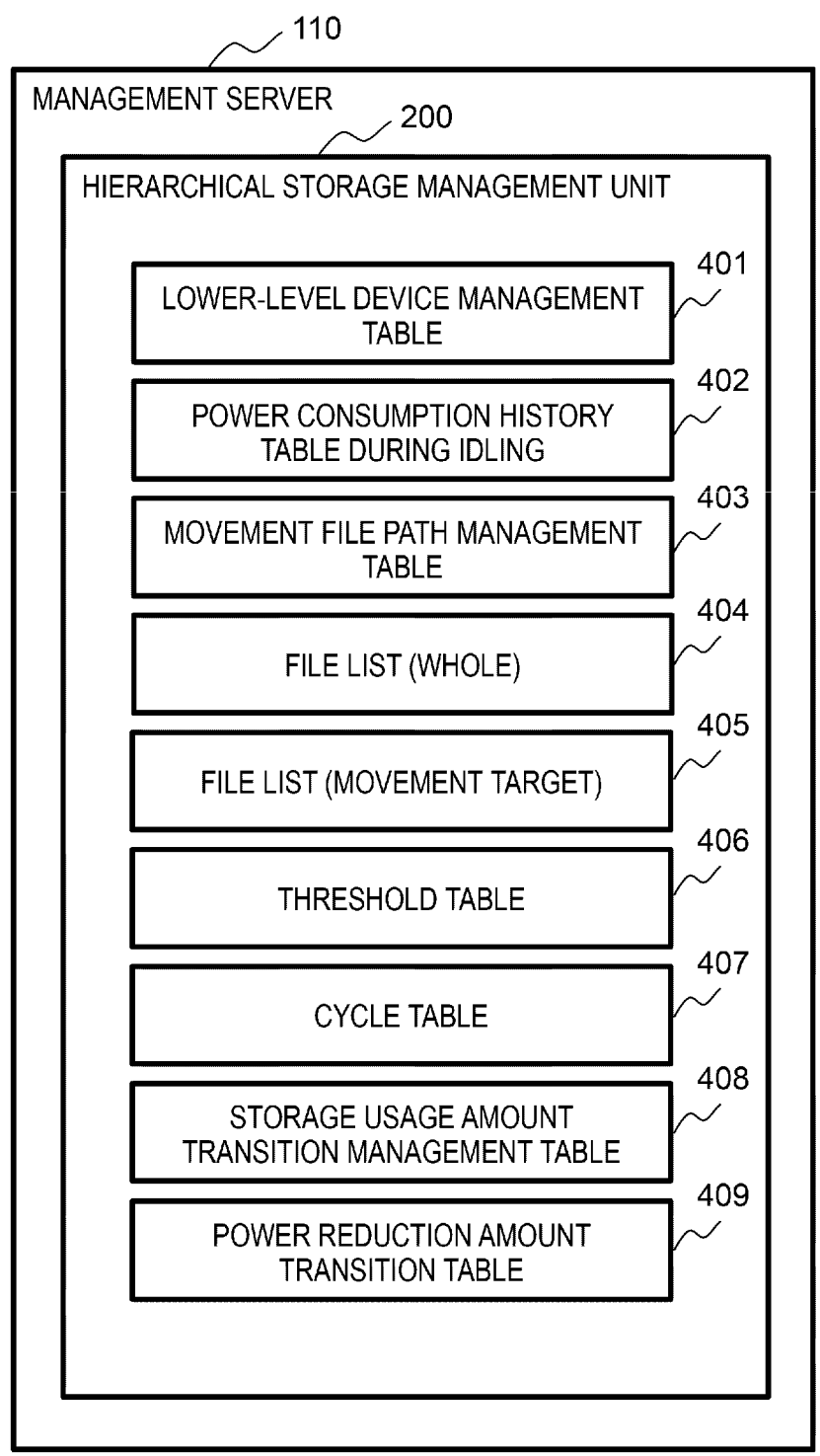
FIG. 4 is a block diagram showing data held by the management server according to the embodiment of the invention.

FIG. 4 is a block diagram showing data held by the management server 110 according to the embodiment of the invention.

The hierarchical storage management unit 200 in the management server 110 holds a lower-level device management table 401, a power consumption history table during idling 402, a movement file path management table 403, a file list (whole) 404, a file list (movement target) 405, a threshold table 406, a cycle table 407, a storage usage amount transition management table 408, and a power reduction amount transition table 409. Details thereof will be described later.

Figure 5:
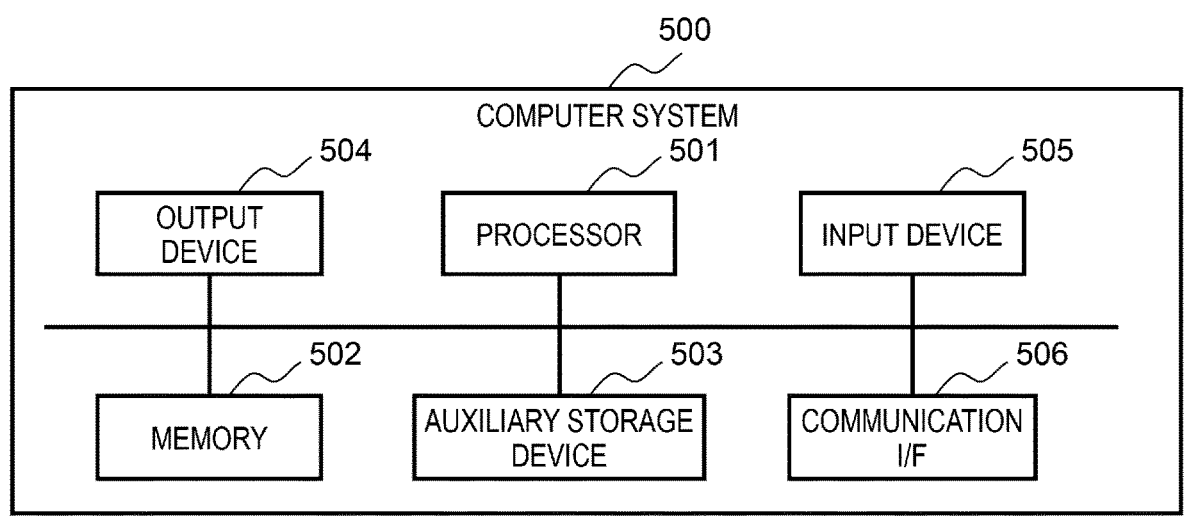
FIG. 5 is a block diagram showing a configuration of hardware of a computer system that implements the management server according to the embodiment of the invention.

FIG. 5 is a block diagram showing a configuration of hardware of a computer system that implements the management server 110 according to the embodiment of the invention.

The management server 110 according to the embodiment shown in FIGS. 1 to 4 can be implemented with, for example, a computer system 500. The computer system 500 includes a processor 501, a memory (main storage device) 502, an auxiliary storage device 503, an output device 504, an input device 505, and a communication interface (I/F) 506. The above components are connected to each other by a bus. The memory 502 and the auxiliary storage device 503 are storage devices and store programs and data used by the processor 501.

The memory 502 is implemented with, for example, a semi-conductor memory, and is used to hold programs that are mainly being executed and data. The processor 501 executes various types of processing according to programs stored in the memory 502. The processor 501 operates according to the programs, so that various function units are implemented.

The auxiliary storage device 503 is implemented with a large-capacity storage device such as a hard disk drive or a solid state drive, and is used to hold programs and data for a long period. For example, the tables and the like shown in FIG. 4 may be held in the auxiliary storage device 503.

The processor 501 can be implemented with a single processing unit or a plurality of processing units, and can include a single or a plurality of arithmetic units, or a plurality of processing cores. The processor 501 can be implemented as one or a plurality of central processing devices, a microprocessor, a microcomputer, a microcontroller, a digital signal processor, a state machine, a logic circuit, a graphics processing device, a chip-on system, and/or any device that operates a signal based on a control instruction.

The programs and data stored in the auxiliary storage device 503 are loaded into the memory 502 at start-up or when needed, and the processor 501 executes the programs to execute various types of processing of the computer system 500. Therefore, in the following description, the processing executed by the hierarchical storage management unit 200 of the management server 110 is processing executed by the processor 501 of the computer system 500 according to the programs by controlling each unit in the computer system 500 as necessary. In the processing executed by the processor 501, for example, when information and the like shown in FIGS. 6 to 14 described later is referred to, at least a part of the information referred to by the processor 501 is loaded from the auxiliary storage device 503 to the memory 502.

The input device 505 is a hardware device for a user to input instructions, information, and the like. The output device 504 is a hardware device that presents various input and output images, and is, for example, a display device or a printing device. The communication I/F 506 is an interface for connecting to a network 230.

The computer system 500 may include two or more processors 501. Functions of the system according to the embodiment can be implemented in a plurality of computer systems 500. In this case, the plurality of computer systems 500 communicate via the network 230. For example, a part of a plurality of functions of the system according to the embodiment may be implemented in one computer system 500, and another part may be implemented in another computer system.

Next, information held by the hierarchical storage management unit 200 of the management server 110 will be described.

FIG. 6 is a diagram showing the lower-level device management table 401 held by the management server 110 according to the embodiment of the invention.

The lower-level device management table 401 manages information related to the storage device provided in the lower-level storage 130. For example, the lower-level device management table 401 includes a lower-level device name 601, a product number 602, power consumption during idling 603, power consumption during reading 604, and power consumption during writing 605.

The lower-level device name 601 is a name of each storage device (for example, the optical disk drive 131, the magnetic tape drive 132, and the public cloud 133) provided in the lower-level storage 130. The product number 602 is a number for identifying each storage device. The power consumption during idling 603, the power consumption during reading 604, and the power consumption during writing 605 indicate power consumption of each storage device during idling, during data reading, and during data writing.

FIG. 7 is a diagram showing the power consumption history table during idling 402 held by the management server 110 according to the embodiment of the invention.

The power consumption history table during idling 402 manages a history of the power consumption amount during idling of the upper-level storage 120. The power consumption history table during idling 402 may be generated and held by, for example, the upper-level storage controller 121, and at least a part thereof may be acquired by the management server 110 as necessary.

The power consumption history table during idling 402 includes a date and time 701 and a power consumption amount 702. The measured power consumption amount of the upper-level storage 120 and the date and time of the measurement are stored in the power consumption amount 702 and the date and time 701.

FIG. 8 is a diagram showing the movement file path management table 403 held by the management server 110 according to the embodiment of the invention.

The movement file path management table 403 manages file paths of a movement source and a movement destination of a movement target file. For example, the movement file path management table 403 includes a movement target file name 801, a movement source file path 802, and a movement destination device and path 803. The movement target file name 801 is a file name for identifying a movement target file. The movement source file path 802 indicates a file path of the movement target file in the upper-level storage 120. The movement destination device and path 803 indicates a movement destination device and file path of the movement target file among the storage devices provided in the lower-level storage 130.

FIG. 9 is a diagram showing the file list (whole) 404 held by the management server 110 according to the embodiment of the invention.

The file list (whole) 404 is information for managing all files stored in the upper-level storage 120. For example, the file list (whole) 404 includes a file name 901, a file size 902, and a last update date and time 903 of each file stored in the upper-level storage 120. In the embodiment, the last update date and time indicating a date and time at which the file is last updated is described as an example, and a last access date and time indicating a date and time at which either the update or the read for the file is last performed may be used.

FIG. 10 is a diagram showing the file list (movement target) 405 held by the management server 110 according to the embodiment of the invention.

The file list (movement target) 405 manages files that are once stored in the upper-level storage 120 and then determined to be movement targets to the lower-level storage 130. For example, the file list (movement target) 405 includes a file name 1001, a file size 1002, and a last update date and time 1003 of each of files determined as the movement targets. Files registered in the file list (movement target) 405 are stored in the lower-level storage 130. Information related to a file moved from the lower-level storage 130 to the upper-level storage 120 by removement described later is deleted from the file list (movement target) 405.

FIG. 11 is a diagram showing the threshold table 406 held by the management server 110 according to the embodiment of the invention.

The threshold table 406 manages a threshold used for determining whether to move the file stored in the upper-level storage 120 to the lower-level storage 130. For example, the threshold table 406 includes a target file size 1101 and an elapsed time from the last update date and time 1102. The target file size indicates a size of a file to be determined whether to move. The elapsed time from the last update date and time 1102 indicates a time from a time point at which the file is last updated to a current time point.

In the example of FIG. 11, ranges of sizes of different files are set in the target file size 1101 of each record of the threshold table 406. In the elapsed time from the last update date and time 1102 of each record, an elapsed time from the last update date and time serving as a reference for determining whether the file is a movement target is set for each set range of the size of the file.

Normally, the range is set such that as a value of the target file size 1101 increases, a value of the elapsed time from the last update date and time 1102 increases. Accordingly, power consumption due to frequent movement of a file having a large size is reduced. When the lower-level storage 130 includes a plurality of storage devices (different types of storage devices such as the optical disk drive 131 and the magnetic tape drive 132) as shown in FIG. 1, the threshold table 406 may be generated for each storage device. A specific example of a method of setting the value of the elapsed time from the last update date and time 1102 corresponding to the target file size 1101 will be described later.

FIG. 12 is a diagram showing the cycle table 407 held by the management server 110 according to the embodiment of the invention.

The cycle table 407 manages execution cycles of various types of processing performed by the management server 110. For example, the cycle table 407 includes a processing name 1201 and an execution cycle 1202. In the example of FIG. 12, the names of the processing such as "file update information acquisition", "threshold determination and movement target list update", and "file hierarchy movement" are held as the processing name 1201 of each record of the cycle table 407, and a predetermined time (for example, the number of days) is held as the execution cycle 1202 corresponding to the processing. Each processing is executed in a cycle indicated by the execution cycle 1202.

FIG. 13 is a diagram showing a storage usage amount transition management table 408 held by the management server 110 according to the embodiment of the invention.

The storage usage amount transition management table 408 manages transition of a usage amount (that is, a total amount of stored data) of the upper-level storage 120. For example, the storage usage amount transition management table 408 includes a date and time 1301 indicating a date and time when the usage amount is measured, and a storage usage amount 1302 indicating the usage amount measured at each date and time.

FIG. 14 is a diagram showing the power reduction amount transition table 409 held by the management server 110 according to the embodiment of the invention.

The power reduction amount transition table 409 manages transition of a power reduction amount calculated by a method described later. For example, the power reduction amount transition table 409 includes a date and time 1401 and a power reduction amount 1402 indicating a power reduction amount calculated at a time point indicated by a value of the date and time 1401.

Next, the processing executed in the storage system 100 according to the embodiment will be described with reference to FIGS. 15 and 16.

FIG. 15 is a sequence diagram showing processing executed in the storage system 100 according to the embodiment of the invention.

Figure 16:
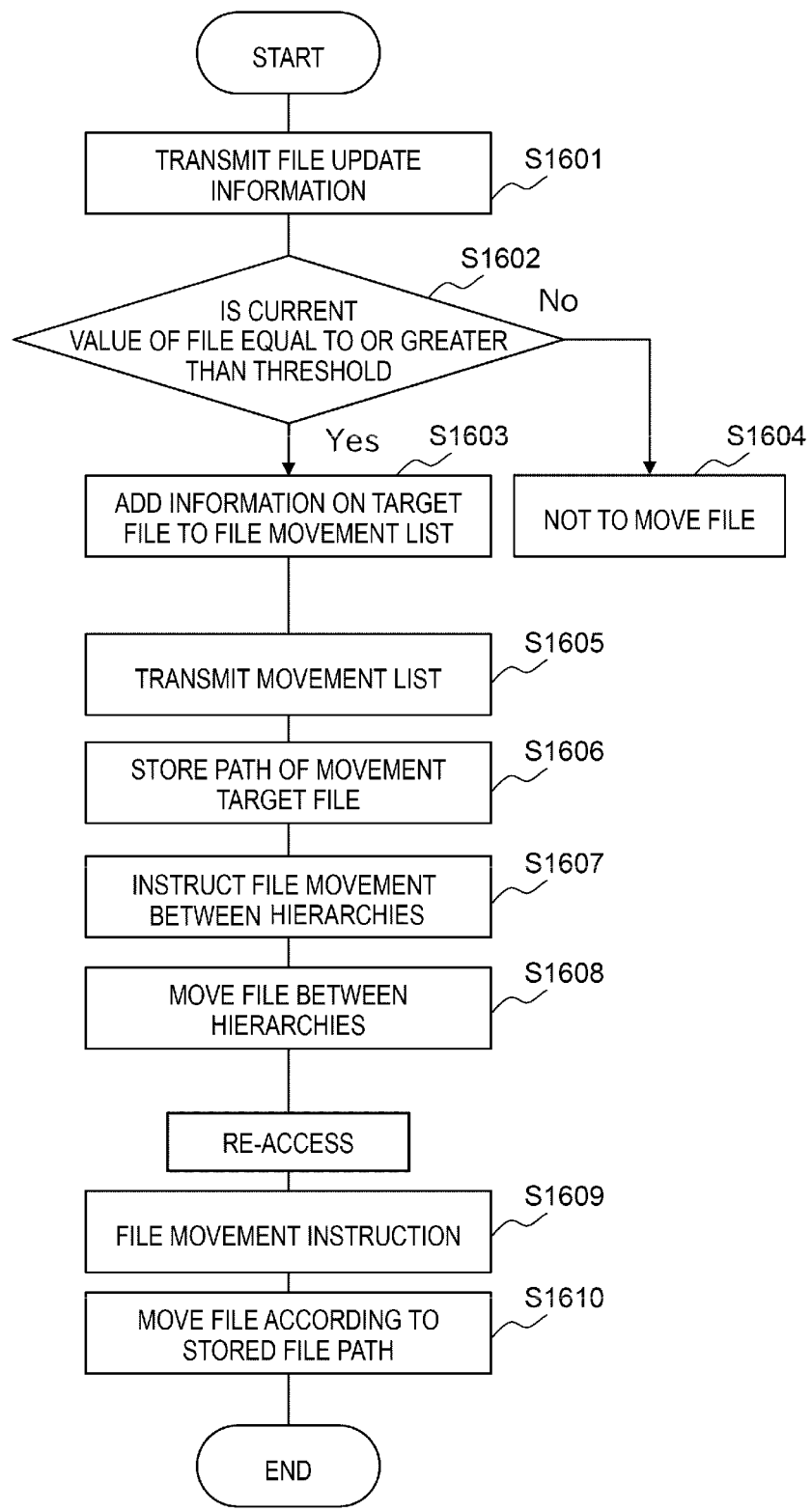
FIG. 16 is a flowchart showing processing executed in the storage system according to the embodiment of the invention.

FIG. 16 is a flowchart showing processing executed in the storage system 100 according to the embodiment of the invention.

FIGS. 15 and 16 both describe the same processing. That is, FIG. 15 is a sequence diagram in which exchange of data between components of the storage system 100 during processing is described to be clear, and FIG. 16 is a flowchart in which a flow of the processing is described to be clear. A correspondence relationship between two steps is as follows.

A controller 1511 of the upper-level storage 120 periodically acquires a list of all files stored in a drive 1512 of the upper-level storage 120, and transmits the list to the management server 110 (steps S1501 and S1601). The processing may be executed, for example, based on the execution cycle of the file update information acquisition held in the cycle table 407. The controller 1511 is, for example, the upper-level storage controller 121, and the drive 1512 is, for example, the SSD 122 or the HDD 123. The management server 110 holds a list of files received from the controller 1511 as the file list (whole) 404.

Next, the determination unit 301 in the condition determination unit 201 of the management server 110 determines, for each file included in the file list received from the controller 1511, whether a current value of the file is equal to or greater than a threshold (steps S1502 and S1602). The determination unit 301 determines to move a file whose current value is determined to be equal to or greater than the threshold, and adds information on the file to the file list (movement target) 405 (steps S1502 and S1603). On the other hand, the determination unit 301 determines not to move a file whose current value is determined not to be equal to or greater than the threshold (steps S1502 and S1604). In this case, the information on the file is not added to the file list (movement target) 405.

Here, the example of determining whether the current value of each file is equal to or greater than the threshold in steps S1502 and S1602 is described.

For example, the determination unit 301 may calculate the following Expression (1) for each file stored in the upper-level storage 120, and determine that a file to be calculated (hereinafter, also referred to as a target file) is to be moved to the lower-level storage 130 when Expression (1) is satisfied.

$$PC_{idle}(\text{upper}) > PC(\text{down}) + PC(\text{up}) + PC_{idle}(\text{lower}) \qquad (1)$$

Here, $PC_{idle}$ (upper) is a power amount consumed to hold the target file in the upper-level storage 120. The $PC_{idle}$ can be calculated, for example, by calculating a ratio of the size of the file to a used capacity of the upper-level storage 120, multiplying the power consumption of the upper-level storage 120 in an idle state by the ratio, and further multiplying the resulting power consumption by the elapsed time from the last update date and time of the target file. Here, the power consumption of the upper-level storage 120 in the idle state can be acquired from the power consumption history table during idling 402 (FIG. 7), the used capacity of the upper-level storage 120 can be acquired from the storage usage amount transition management table 408 (FIG. 13), and the size of the target file can be acquired from the file list (whole) 404 (FIG. 9). The elapsed time from the last update date and time of the target file can be calculated based on, for example, the last update date and time 903 and the current time point of the target file in the file list (whole) 404 shown in FIG. 9. Here, the elapsed time from the last update date and time of the target file is an example of an index of an update frequency of the target file. When information such as an average value of past access intervals of each file or a predicted value of future access intervals can be used, the information may be used.

On the other hand, $PC_{idle}$ (lower) is a power amount consumed to hold the target file in the lower-level storage 130. The $PC_{idle}$ (lower) can be calculated, for example, by multiplying the power consumption during idling 603 of the lower-level device management table 401 (FIG. 6) by the access interval of the target file.

PC (down) is a power amount consumed to move the target file from the upper-level storage 120 to the lower-level storage 130 when it is determined that the target file is to be moved to the lower-level storage 130. PC (down) can be calculated, for example, by summing up calculation results of the following Expressions (2) to (5).

The determination unit 301 calculates, according to Expression (2), a power consumption amount of write processing to the lower-level storage 130 in processing of writing the target file read from the upper-level storage 120 to the lower-level storage 130.

$$P_{write} * \text{T\_down}_{write} \qquad (2)$$

Here, $P_{write}$ is power consumed when the lower-level storage 130 performs the processing of writing the target file to a write destination device (for example, any of the optical disk drive 131, the magnetic tape drive 132, and the public cloud 133). The $P_{write}$ can be acquired from, for example, the power consumption during writing 605 in the lower-level device management table 401. $\text{T\_down}_{write}$ is a predicted value of a time required for the lower-level storage 130 to write the target file to the write destination device. The $\text{T\_down}_{write}$ can be calculated based on, for example, the size of the target file and a data transfer rate during writing to the write destination device.

The determination unit 301 calculates, according to Expressions (3) to (5), a power consumption amount of read processing from the upper-level storage 120 in processing of writing the target file read from the upper-level storage 120 to the lower-level storage 130.

$$CPU: P_n * \text{T\_down}_{read} = \left\{ (P_{max} - P_{idle}) * \frac{n}{100} + P_{idle} \right\} * \text{T\_down}_{read} \qquad (3)$$

$$MEMORY: P_n * \text{T\_down}_{read} = \qquad (4)$$
$$\left\{ (P_{max} - P_{idle}) * \frac{n}{100} + P_{idle} \right\} * \text{T\_down}_{read}$$

$$DRIVE: P_{read} * \text{T\_down}_{read} \qquad (5)$$

Expression (3) is a calculation expression of a power consumption amount of a central processing unit (CPU, not shown) of the upper-level storage controller 121 among the power consumption amount of the read processing from the upper-level storage 120. In Expression (3), $P_{max}$ and $P_{idle}$ are maximum power consumption and power consumption during idling of the CPU of the upper-level storage controller 121. n is a CPU usage rate (%) of the upper-level storage controller 121 during the read processing. $\text{T\_down}_{read}$ is a predicted value of a time required for the lower-level storage 130 to read the target file from the upper-level storage 120. The $\text{T\_down}_{read}$ can be calculated based on, for example, the size of the target file and a data transfer rate during reading from a read destination device.

Expression (4) is a calculation expression of a power consumption amount of a memory (not shown) of the upper-level storage controller 121 among the power consumption amount of the read processing from the upper-level storage 120. In Expression (4), $P_{max}$ and $P_{idle}$ are maximum power consumption and power consumption during idling of the memory of the upper-level storage controller 121. n is a memory usage rate (%) of the upper-level storage controller 121 during the read processing. $\text{T\_down}_{read}$ is the same as in Expression (3).

Expression (5) is a calculation expression of a power consumption amount of a drive (for example, the SSD 122 or the HDD 123) of the upper-level storage 120 among the power consumption amount of the read processing from the upper-level storage 120. Here, $P_{read}$ is power consumption of the read processing from the drive. The $\text{T\_down}_{read}$ is the same as that in Expression (3).

Returning to Expression (1), PC (up) is a power consumption amount during file re-access, that is, a power amount consumed to, after moving the target file to the lower-level storage 130, move the target file from the lower-level storage 130 to the upper-level storage 120 in response to an access from the host computer. The PC (up) can be calculated, for example, by summing up calculation results of the following Expressions (6) to (9).

The determination unit 301 calculates, according to Expression (6), a power consumption amount of read processing from the lower-level storage 130 in processing of writing the target file read from the lower-level storage 130 to the upper-level storage 120.

$$P_{read} * \text{T\_up}_{read} \qquad (6)$$

Here, $P_{read}$ is power consumed when the lower-level storage 130 performs the processing of reading the target file from the write destination device. The $P_{read}$ can be acquired from, for example, the power consumption during reading 604 in the lower-level device management table 401. $\text{T\_up}_{read}$ is a predicted value of a time required for the lower-level storage 130 to read the target file from the write destination device. The $\text{T\_Up}_{read}$ can be calculated based on, for example, the size of the target file and a data transfer rate during reading from the write destination device.

The determination unit 301 calculates, according to Equations (7) to (9), a power consumption amount of write processing to the upper-level storage 120 in processing of writing the target file read from the lower-level storage 130 to the upper-level storage 120.

$$CPU: P_n * \text{T\_up}_{write} = \left\{ (P_{max} - P_{idle}) * \frac{n}{100} + P_{idle} \right\} * \text{T\_up}_{write} \qquad (7)$$

$$MEMORY: P_n * \text{T\_up}_{write} = \left\{ (P_{max} - P_{idle}) * \frac{n}{100} + P_{idle} \right\} * \text{T\_up}_{write} \qquad (8)$$

$$DRIVE: P_{write} * \text{T\_up}_{write} \qquad (9)$$

Expression (7) is a calculation expression of a power consumption amount of the CPU of the upper-level storage controller 121 among the power consumption amount of the write processing to the upper-level storage 120. In Expression (7), the $P_{max}$ and $P_{idle}$ are the same as those in Expression (3). n is a CPU usage rate (%) of the upper-level storage controller 121 during the write processing. $\text{T\_up}_{write}$ is a predicted value of a time required for the processing of writing the target file to the upper-level storage 120. The $\text{T\_up}_{write}$ can be calculated based on, for example, the size of the target file and the data transfer rate during reading from the read destination device (that is, the SSD 122 or the HDD 123 of a destination to write back the target file read from the lower-level storage 130).

Expression (8) is a calculation expression of the power consumption amount of the memory (not shown) of the upper-level storage controller 121 among g the power consumption amount of the write processing to the upper-level storage 120. In Expression (8), the $P_{max}$ and $P_{idle}$ are the same as those in Expression (4). n is a memory usage rate (%) of the upper-level storage controller 121 during the write processing. The $\text{T\_up}_{write}$ is the same as that in Expression (7).

Expression (9) is a calculation expression of the power consumption amount of the drive (for example, the SSD 122 or the HDD 123) of the upper-level storage 120 among the power consumption amount of the write processing to the upper-level storage 120. Here, $P_{write}$ is power consumption of the write processing to the drive. $T\_up_{write}$ is the same as that in Expression (7).

In step S1602 of FIG. 16, when Expression (1) is calculated for a certain file, the file is actually held in the upper-level storage 120 from the last update to the present. In this case, the left side of Expression (1) is an estimated value of power consumed for storing the file during a period, in which the file is stored in the upper-level storage 120, from the last update of the file to the present.

On the other hand, the right side of Expression (1) is an estimated value of power consumed for movement of the file and storage of the file in the lower-level storage 130 when the file is temporarily moved from the upper-level storage 120 to the lower-level storage 130 immediately after the last update and then moved from the lower-level storage 130 to the upper-level storage 120 immediately before the current time point.

Therefore, that Expression (1) is satisfied means that it is estimated that the power consumption is smaller (that is, an environmental load due to power consumption, for example, a carbon dioxide ($CO_2$) emission amount is also smaller) when the file is once moved to the lower-level storage 130 after the last update than when the file is continuously stored in the upper-level storage 120. In this case, the determination unit 301 determines to move the file, and adds the information on the file to the file list (movement target) 405.

The determination unit 301 may perform the calculation of Expressions (1) to (9) every time the processing of steps S1502 and S1602 are executed for each file, and may calculate a threshold of the determination in advance based on Expressions (1) to (9) and perform the determination based on the threshold in steps S1502 and S1602.

For example, the determination unit 301 may calculate in advance a relationship between the size of the file which is the movement target and an elapsed time from the last update date and time satisfying Expression (1) for the file having the size, and may hold the relationship as the threshold table 406. In the example of FIG. 11, a range of the size of the file is set as the target file size 1101. In this case, the value of the elapsed time 1102 from the last update date and time corresponding to the range is set such that Expression (1) is satisfied for a file having any size within the corresponding range.

When the lower-level storage 130 includes a plurality of storage devices, the value of the elapsed time 1102 from the last update date and time may be set such that Expression (1) is satisfied in any of the storage devices, or the threshold table 406 may be generated for each storage device.

By determining whether to move each file to the lower-level storage 130 as described above, it is possible to move a file with a low update frequency to the lower-level storage 130, reduce the total power consumption amount including the power consumption required for moving the file, and reduce the environmental load such as the $CO_2$ emission amount.

Next, the rearrangement unit 302 in the condition determination unit 201 transmits, to the controller 1511, a list (that is, a movement list) of files added to the file list (movement target) 405 (steps S1503 and 1605). The controller 1511 stores a path of a movement target file included in the movement list (steps S1504 and S1606), and instructs movement of the movement target file between hierarchies (steps S1505 and S1607). According to the instruction, the movement target file is moved from the drive 1512 of the upper-level storage 120 to a drive 1514 of the lower-level storage 130 (steps S1506 and S1608).

Thereafter, a file moved to the lower-level storage 130 is re-accessed. For example, when the upper-level storage 120 receives an access request to a file from the host computer and the file is included in the file list (movement target) 405, the file is stored not in the upper-level storage 120 but in the lower-level storage 130.

In this case, the controller 1511 transmits a file movement instruction to a controller 1513 of the lower-level storage 130 (steps S1507 and S1609). According to the instruction, the movement target file is moved from the drive 1514 of the lower-level storage 130 to the drive 1512 of the upper-level storage 120 (steps S1508 and S1610). At this time, according to the movement file path management table 403, an original file path of the movement target file (that is, a file path before being moved to the lower-level storage 130) is reproduced.

Thereafter, the processing is ended.

FIG. 17 is a diagram showing a screen displayed by the storage system 100 according to the embodiment of the invention. A display screen 1700 shown in FIG. 17 is an example of a screen displayed by the output device 504 of the computer system 500 implementing the management server 110. The display screen 1700 includes a $CO_2$ emission amount display section 1701, a power consumption amount display section 1702, a maximum temperature display section 1703, and a $CO_2$ emission reduction amount display section 1704.

The $CO_2$ emission amount display section 1701 displays, for example, an actual result of a $CO_2$ emission amount calculated from an actual result of the power consumption amount of the storage system 100. In the example of FIG. 17, a graph indicating the $CO_2$ emission amount per month is displayed.

The power consumption amount display section 1702 displays, example, the actual result of the power consumption amount of the storage system 100. In the example of FIG. 17, a graph indicating transition of an average value of a power consumption amount for each time zone in September 2022 is displayed as a graph indicating a power consumption amount for each time zone in a certain month.

The maximum temperature display section 1703 displays, for example, an actual result of a temperature measured in the storage system 100. In the example of FIG. 17, a graph indicating transition of an average value of a temperature for each time zone in September 2022 is displayed as a graph indicating the temperature in the storage system 100 for each time zone of a certain month. In this example, temperatures are measured at a plurality of parts of the storage system 100, an average value of the temperature is calculated for each part, and a maximum value among the calculated average values of the temperatures of the parts is indicated by a solid line and the average value is indicated by a broken line.

In the $CO_2$ emission reduction amount display section 1704, in addition to a graph similar to that displayed in the $CO_2$ emission amount display section 1701, a $CO_2$ emission reduction amount due to data movement between hierarchies (that is, the movement from the upper-level storage 120 to the lower-level storage 130) shown in the embodiment is displayed. In the example of FIG. 17, the $CO_2$ emission reduction amount due to the data movement between the hierarchies is displayed by a broken line. That is, a total value of a solid line portion and a broken line portion of the graph displayed in the $CO_2$ emission reduction amount display section 1704 indicates the $CO_2$ emission amount when the data movement is not performed between the hierarchies.

For example, in step S1602 of FIG. 16, Expression (1) may be calculated for each file stored in the upper-level storage 120. As a result, a difference between the right side and the left side of Expression (1) of a file determined to be moved between the hierarchies may be summed. The summation may be held in the power reduction amount transition table 409 (FIG. 14), and the $CO_2$ emission amount calculated based on the summation may be displayed as the broken line portion of the graph of the $CO_2$ emission reduction amount display section 1704. The $CO_2$ emission amount based on the power consumption amount can be calculated based on, for example, a $CO_2$ emission coefficient published by an electric power company. By performing such display, it is possible to easily grasp an effect of reducing the environmental load due to the data movement between the hierarchies.

The system according to the embodiment of the invention may be implemented as follows.

(1) A storage system (for example, the storage system 100) includes: an upper-level storage device (for example, the upper-level storage 120) configured to hold data; a lower-level storage device (for example, the lower-level storage 130) whose power consumption for holding data is smaller than that of the upper-level storage device; and a management device (for example, the management connected to the upper-level storage device and the lower-level storage device. The management device includes a processor (for example, the processor 501) and a memory (for example, the memory 502). The memory is configured to hold file information (for example, the file list (whole) 404) including information indicating a size of each file held in the upper-level storage device and information related to an access frequency of the file, and power consumption information (for example, the lower-level device management table 401 and the power consumption history table during idling 402) including information related to power consumption of the upper-level storage device and the lower-level storage device. The processor is configured to determine, for each file stored in the upper-level storage device, based on a size of a target file and an access frequency of the target file acquired from the file information, and the power consumption information, whether power consumption for holding the target file is to be reduced by moving the target file to the lower-level storage device (for example, steps S1502 and S1602), and output, when it is determined that the power consumption for holding the target file is to be reduced by moving the target file to the lower-level storage device, an instruction to move the target file from the upper-level storage device to the lower-level storage device (for example, steps S1505 and S1607).

Accordingly, when various devices are used as a lower-level storage in a hierarchical storage, it is possible to appropriately determine whether to move data to reduce an environmental load in consideration of a power consumption amount required for data movement.

(2) In the above (1), the processor determines that the power consumption for holding the target file is to be reduced by moving the target file to the lower-level storage device, when a power consumption amount obtained by adding up a power consumption amount when the lower-level storage device holds the target file during a period of an access interval of the target file, the access interval being specified based on the access frequency of the target file, a power consumption amount for moving the target file from the upper-level storage device to the lower-level storage device, and a power consumption amount for moving the target file from the lower-level storage device to the upper-level storage device is smaller than a power consumption amount when the upper-level storage device holds the target file during the period of the access interval (for example, Expression (1)).

Accordingly, it is possible to appropriately determine whether to move data to reduce an environmental load in consideration of a power consumption amount required for data movement.

(3) In the above (2), the power consumption amount when the upper-level storage device holds the target file during the period of the access interval of the target file is calculated based on a ratio of the size of the target file to a used capacity of the upper-level storage device, power consumption of the upper-level storage device during idling acquired from the power consumption information, and a length of the period of the access interval of the target file. The power consumption amount for moving the target file from the upper-level storage device to the lower-level storage device is calculated based on the power consumption information, a time required for reading the target file from the upper-level storage device and a time required for writing the target file to the lower-level storage device, the times being predicted based on the size of the target file (for example, Expressions (2) to (5)). The power consumption amount for moving the target file from the lower-level storage device to the upper-level storage device is calculated based on the power consumption information, and a time required for reading the target file from the lower-level storage device and a time required for writing the target file to the upper-level storage device, the times being predicted based on the size of the target file (for example, Expressions (6) to (9)).

Accordingly, it is possible to appropriately determine whether to move data to reduce an environmental load in consideration of a power consumption amount required for data movement.

(4) In the above (3), the file information (for example, the last update date and time 903) includes information indicating a last access date and time of each file as information related to the access frequency of the file, and a period of an access interval of the file is a period from the last access date and time to a current date and time of the file.

Accordingly, it is possible to appropriately determine whether to move data to reduce an environmental load.

(5) In the above (4), the memory is configured to hold threshold information (for example, the threshold table 406) that associates a size of a file stored in the upper-level storage device with an elapsed time from the last access date and time. In the threshold information, the elapsed time from the last access date and time is set such that a power consumption amount obtained by adding up a power consumption amount when the lower-level storage device holds a file having a corresponding size during a period, the period having a length indicated by the elapsed time from the last access date and time, a power consumption amount for moving the file having the corresponding size from the upper-level storage device to the lower-level storage device, and a power consumption amount for moving the file having the corresponding size from the lower-level storage device to the upper-level storage device is smaller than a power consumption amount when the upper-level storage device holds the file having the corresponding size during the period. When the elapsed time from the last access date and time to the current date and time of the target file is longer than the elapsed time from the last access date and time corresponding to the size of the target file, the processor determines, based on the threshold information, that the power consumption for holding the target file is to be reduced by moving the target file to the lower-level storage device.

Accordingly, it is possible to easily and appropriately determine whether to move data to reduce an environmental load.

(6) In the above (1), The processor is configured to calculate a reduction amount of power consumption when, among files stored in the upper-level storage device, a file whose power consumption for holding is determined to be reduced by being moved to the lower-level storage device is moved to the lower-level storage device, and output at least one of the calculated reduction amount of the power consumption and a reduction amount of an environmental load estimated from the reduction amount of the power consumption (for example, the $CO_2$ emission reduction amount display section 1704).

Accordingly, it is possible to easily grasp an effect of reducing an environmental load due to data movement between hierarchies.

(7) In the above (6), the reduction amount of the environmental load is a carbon dioxide emission reduction amount estimated from the reduction amount of the power consumption.

Accordingly, it is possible to easily grasp an effect of reducing an environmental load due to data movement between hierarchies.

(8) In the above (1), the upper-level storage device includes at least one of a hard disk drive (for example, the HDD 123) and a solid state drive (for example, the SSD 122), and the lower-level storage device includes at least one of an optical disk drive (for example, the optical disk drive 131), a magnetic tape drive (for example, the magnetic tape drive 132), and a public cloud (for example, the public cloud 133).

Accordingly, when various devices are used as a lower-level storage in a hierarchical storage, it is possible to appropriately determine whether to move data to reduce an environmental load in consideration of a power consumption amount required for data movement.

The invention is not limited to the above embodiment, and includes various modifications. For example, the above embodiment has been described in detail for better understanding of the invention, and are not necessarily limited to those having all the configurations of the description. A part of configurations of one embodiment can be replaced with configurations of another embodiment, and configurations of one embodiment can be added to configurations of another embodiment. A part of the configurations of each embodiment may be added to, deleted from, or replaced with another configuration.

A part or all of the above configurations, functions, processing units, processing methods, and the like may be implemented by hardware through, for example, design using an integrated circuit. The above configurations, functions, and the like may also be implemented by software by interpreting and executing a program for implementing respective functions by a processor. Information of a program, a table, a file, and the like for implementing functions can be stored in a storage device such as a nonvolatile semi-conductor memory, a hard disk drive, and a solid state drive (SSD), or a computer-readable non-transitory data storage medium such as an IC card, an SD card, and a DVD.

Control lines and information lines show those considered to be necessary for description, and not all of the control lines and the information lines are necessarily shown on a product. Actually, it may be considered that almost all the configurations are connected to each other.

What is claimed is:

1. A storage system comprising:
an upper-level storage device configured to hold data;
a lower-level storage device whose power consumption for holding data is smaller than that of the upper-level storage device; and
a management device connected to the upper-level storage device and the lower-level storage device, wherein
the management device includes a processor and a memory,
the memory is configured to hold
file information including information indicating a size of each file held in the upper-level storage device and information related to an access frequency of each said file, and
power consumption information including information related to power consumption of the upper-level storage device and the lower-level storage device, and the processor is configured to
determine, for each file stored in the upper-level storage device, based on a size of a target file and an access frequency of the target file acquired from the file information, and the power consumption information, whether power consumption for holding the target file is to be reduced by moving the target file to the lower-level storage device, and
output, when it is determined that the power consumption for holding the target file is to be reduced by moving the target file to the lower-level storage device, an instruction to move the target file from the upper-level storage device to the lower-level storage device,
wherein the processor determines that the power consumption for holding the target file is to be reduced when a first power consumption amount associated with the lower-level storage device is less than a second power consumption amount associated with the upper-level storage device,
wherein the first power consumption amount is obtained by adding up:
a power consumption amount when the lower-level storage device holds the target file during a period of an access interval of the target file, the access interval being specified based on the access frequency of the target file,
a power consumption amount for moving the target file from the upper-level storage device to the lower-level storage device, and
a power consumption amount for moving the target file from the lower-level storage device to the upper-level storage device,
wherein the second power consumption amount is a power consumption amount when the upper-level storage device holds the target file during the period of the access interval,
wherein the second power consumption amount is calculated based on a ratio of the size of the target file to a used capacity of the upper-level storage device, power consumption of the upper-level storage device during idling acquired from the power consumption information, and a length of the period of the access interval of the target file.

2. The storage system according to claim 1, wherein
the power consumption amount for moving the target file from the upper-level storage device to the lower-level storage device is calculated based on the power consumption information, a time required for reading the target file from the upper-level storage device, and a time required for writing the target file to the lower-level storage device, the time required for reading the target file from the upper-level storage device and the time required for writing the target file to the lower-level storage device are predicted based on the size of the target file, and
the power consumption amount for moving the target file from the lower-level storage device to the upper-level storage device is calculated based on the power consumption information, a time required for reading the target file from the lower-level storage device, and a time required for writing the target file to the upper-level storage device, the time required for reading the target file from the lower-level storage device and the time required for writing the target file to the upper-level storage device are predicted based on the size of the target file.

3. The storage system according to claim 2, wherein
the file information includes information indicating a last access date and time of each file as information related to the access frequency of each said file, and
a period of an access interval of each said file is a period from the last access date and time to a current date and time of each said file.

4. The storage system according to claim 3, wherein
the memory is configured to hold threshold information that associates a size of a file stored in the upper-level storage device with an elapsed time from the last access date and time,
in the threshold information, the elapsed time from the last access date and time is set such that a power consumption amount obtained by adding up:
　a power consumption amount when the lower-level storage device holds a file having a corresponding size during a period, the period having a length indicated by the elapsed time from the last access date and time,
　a power consumption amount for moving the file having the corresponding size from the upper-level storage device to the lower-level storage device, and
　a power consumption amount for moving the file having the corresponding size from the lower-level storage device to the upper-level storage device,
is smaller than a power consumption amount when the upper-level storage device holds the file having the corresponding size during the period, and
when the elapsed time from the last access date and time to the current date and time of the target file is longer than the elapsed time from the last access date and time corresponding to the size of the target file, the processor determines, based on the threshold information, that the power consumption for holding the target file is to be reduced by moving the target file to the lower-level storage device.

5. The storage system according to claim 1, wherein
the processor is configured to calculate a reduction amount of power consumption when, among files stored in the upper-level storage device, a file whose power consumption for holding is determined to be reduced by being moved to the lower-level storage device is moved to the lower-level storage device, and output at least one of the calculated reduction amount of the power consumption and a reduction amount of an environmental load estimated from the reduction amount of the power consumption.

6. The storage system according to claim 5, wherein
the reduction amount of the environmental load is a carbon dioxide emission reduction amount estimated from the reduction amount of the power consumption.

7. The storage system according to claim 1, wherein
the upper-level storage device includes at least one of a hard disk drive and a solid state drive, and
the lower-level storage device includes at least one of an optical disk drive, a magnetic tape drive, and a public cloud.

8. A management method of a storage system, wherein
the storage system includes an upper-level storage device configured to hold data, a lower-level storage device whose power consumption for holding data is smaller than that of the upper-level storage device, and a management device connected to the upper-level storage device and the lower-level storage device,
the management device includes a processor and a memory,
the memory is configured to hold
　file information including information indicating a size of each file held in the upper-level storage device and information related to an access frequency of each said file, and
　power consumption information including information related to power consumption of the upper-level storage device and the lower-level storage device, and the management method of the storage system comprises:
determining by the processor, for each file stored in the upper-level storage device, based on a size of a target file and an access frequency of the target file acquired from the file information, and the power consumption information, whether power consumption for holding the target file is to be reduced by moving the target file to the lower-level storage device; and
outputting by the processor, when it is determined that the power consumption for holding the target file is to be reduced by moving the target file to the lower-level storage device, an instruction to move the target file from the upper-level storage device to the lower-level storage device,
wherein the processor determines that the power consumption for holding the target file is to be reduced when a first power consumption amount associated with the lower-level storage device is less than a second power consumption amount associated with the upper-level storage device,
wherein the first power consumption amount is obtained by adding up:
　a power consumption amount when the lower-level storage device holds the target file during a period of an access interval of the target file, the access interval being specified based on the access frequency of the target file,
　a power consumption amount for moving the target file from the upper-level storage device to the lower-level storage device, and
　a power consumption amount for moving the target file from the lower-level storage device to the upper-level storage device, wherein the second power consumption amount is a power consumption amount when the upper-level storage device holds the target file during the period of the access interval, and wherein the second power consumption amount is calculated based on a ratio of the size of the target file to a used capacity of the upper-level storage device, power consumption of the upper-level storage device during idling acquired from the power consumption information, and a length of the period of the access interval of the target file.

9. A management device of a storage system, wherein the storage system includes an upper-level storage device configured to hold data and a lower-level storage device whose power consumption for holding data is smaller than that of the upper-level storage device, the management device includes a processor and a memory, the memory is configured to hold file information including information indicating a size of each file held in the upper-level storage device and information related to an access frequency of each said file, and power consumption information including information related to power consumption of the upper-level storage device and the lower-level storage device, and the processor is configured to determine, for each file stored in the upper-level storage device, based on a size of a target file and an access frequency of the target file acquired from the file information, and the power consumption information, whether power consumption for holding the target file is to be reduced by moving the target file to the lower-level storage device, and output, when it is determined that the power consumption for holding the target file is to be reduced by moving the target file to the lower-level storage device, an instruction to move the target file from the upper-level storage device to the lower-level storage device, wherein the processor determines that the power consumption for holding the target file is to be reduced when a first power consumption amount associated with the lower-level storage device is less than a second power consumption amount associated with the upper-level storage device, wherein the first power consumption amount is obtained by adding up:

a power consumption amount when the lower-level storage device holds the target file during a period of an access interval of the target file, the access interval being specified based on the access frequency of the target file, a power consumption amount for moving the target file from the upper-level storage device to the lower-level storage device, and a power consumption amount for moving the target file from the lower-level storage device to the upper-level storage device, wherein the second power consumption amount is a power consumption amount when the upper-level storage device holds the target file during the period of the access interval, and wherein the second power consumption amount is calculated based on a ratio of the size of the target file to a used capacity of the upper-level storage device, power consumption of the upper-level storage device during idling acquired from the power consumption information, and a length of the period of the access interval of the target file.

* * * * *